US012798077B2

(12) United States Patent
Milan, Jr.

(10) Patent No.: US 12,798,077 B2
(45) Date of Patent: Nov. 17, 2026

(54) MOBILE DIDACTIC ROBOT FOR EDUCATION

(71) Applicant: SOLIS TECNOLOGIA E CONSULTORIA EMPRESARIAL LTDA, Sao Paulo (BR)

(72) Inventor: Jandir Jose Milan, Jr., Sao Paulo (BR)

(73) Assignee: SOLIS TECNOLOGIA E CONSULTORIA EMPRESARIAL LTDA, Sao Paulo (BR)

( * ) Notice: Subject to any disclaimer, the term of this patent is extended or adjusted under 35 U.S.C. 154(b) by 211 days.

(21) Appl. No.: 18/755,101

(22) Filed: Jun. 26, 2024

(65) Prior Publication Data

US 2025/0001582 A1 Jan. 2, 2025

(51) Int. Cl.

| | |
|---|---|
| ***B25J 5/00*** | (2006.01) |
| ***B25J 11/00*** | (2006.01) |
| ***B25J 13/08*** | (2006.01) |
| ***B25J 19/02*** | (2006.01) |

(52) U.S. Cl.

CPC ............ *B25J 5/007* (2013.01); *B25J 11/008* (2013.01); *B25J 13/08* (2013.01); *B25J 19/023* (2013.01)

(58) Field of Classification Search

CPC ... B25J 5/007; B25J 9/08; B25J 11/008; B25J 13/08; B25J 19/023; B25J 19/026

See application file for complete search history.

(56) References Cited

U.S. PATENT DOCUMENTS

2017/0270579 A1* 9/2017 Ridao Carlini ...... G05D 1/0022

FOREIGN PATENT DOCUMENTS

| | | | | |
|---|---|---|---|---|
| BR | MU 7102059-4 U2 | 4/1993 | | |
| BR | 102017003777-0 A2 | 6/2017 | | |
| CN | 106217411 A | * 12/2016 | ........... | G05D 1/0231 |
| KR | 101030477 B1 | * 4/2011 | .......... | F16L 55/1653 |

* cited by examiner

*Primary Examiner* — Timothy Hannon

(74) *Attorney, Agent, or Firm* — Houtteman Law, LLC

(57) ABSTRACT

Mobile robot with an electro-electronic system comprising a Power Control Board and Single Board Computer (CPU) consisting of electronic prototyping boards, a movement system with a pair of front wheels, corresponding stepper motors, a central rear transferring sphere and navigation auxiliary sensor set and a work performance system formed by a front pallet fork set an agricultural sprayer set; a movement (navigation) and work operations command system comprising a remote control device, a rectangular housing with irregular octagonal horizontal section with mountable/demountable modules; a lighting signaling set, consisting of RGB LED tape and buzzer sound, buttonhole, battery power supply system and connector.

8 Claims, 8 Drawing Sheets

MOBILE DIDACTIC ROBOT FOR EDUCATION

INTRODUCTION

The present specification refers to an application for an invention patent for a mobile robot, belonging to the technical sector of teaching materials used in education, which was developed to be an aid in the teaching and learning of technological disciplines, such as: electronics, programming and mechanics, intended for students of technical level, undergraduate, graduate and for improvement courses, specializations and technical qualifications.

DESCRIPTION OF THE STATE OF THE ART

Robot-type equipment used as didactic material in the teaching of various fields of knowledge is already known, which aims to offer means for the development of projects in robotics. Usually, these pieces of equipment are composed of associated systems comprising an electronic system to control the functionalities; movement system; work performance system; by means of a housing in which the devices that make up the systems are mounted and housed.

From the state of the art is known, for example, Brazilian patent application MU 7102059-4 in which a robot-shaped device constructed of parts that complement each other and manufactured from light material is described, forming the imitation of a metalized external finishing robot, consisting of cubic and hollow head and trunk parts, tubular parts imitating arms and legs in addition to hollow parallelepiped-shaped parts making the feet. In the head, appendages are embedded, imitating eyes, nose and ears; in the trunk there is a front rectangular opening with a transparent viewfinder from where a movable screen can be seen by winding two rollers inside the trunk and moved by means of levers and an opening where a device plays tapes. Said hollow robot encloses inside, as if wearing it, a person who acts as a presenter and moves the rollers that change the position of the screen with a message. All equipment serves as a means of disseminating educational messages.

Another document that can be cited is Brazilian BR 1020170037770 comprising an educational kit for robotics to teach introductory concepts of programming and electronics, which is essentially characterized, but not only, by the composition of a low-cost electronic board, used for programming which enables the opportunity to popularize access to introductory knowledge of robotics. Also composed of a box that forms the body of the robot; accessories such as adhesive to compose the eyes and wheels; a USB interface; flash and expandable memory; holes for Wi-Fi expansion and/or built-in Wi-Fi chip; memory; source; voltage at 5V; rechargeable battery; two indicator LEDs; reset button and four docking holes, compatible with open-source software, such as Arduino or similar. A peculiar feature due to the way in which the board was developed is that the formation of the board itself is a USB connector. This feature helps a lot in reducing the cost of the Kit, as it is not necessary to include a USB extension cable.

The objects of these patent applications at the time met expectations, but currently the resources of electronics, computer science, pedagogical techniques have evolved making them outdated.

Thus, the patented equipment, referenced by the Brazilian Patent MU 7102059-4 U2, represents a milestone in educational robotics. This equipment, during the period of validity of its patent, was recognized in Brazil as an innovative solution for technological education. However, it has some limitations and drawbacks, such as complexity of assembly and disassembly: Unlike the robot claimed herein, the previous patented equipment has a more rigid and complex structure, making it difficult for students to assemble and disassemble it. This can limit the customization and adaptability of the robot to different learning needs and projects.

Another drawback concerns restrictions on integration with current technologies, in fact, this previously patented equipment may not be integrated with the most up-to-date and widely used open-source technologies and programming languages. This may restrict the possibilities of exploration and deepening of students in relation to recent advances in the field of robotics and automation. In view of all the above, there is an interest in providing new didactic robot-type equipment that overcomes the drawbacks of the state of the art.

OBJECTIVES OF THE INVENTION

Thus, the objective of the present invention patent application is to provide mobile robot-type equipment that overcomes the problems and limitations of the state of the art, particularly regarding offering a greater field of teaching options.

Another objective is to provide didactic robot-type equipment that incorporates updated robotics resources.

Another objective is to provide didactic robot type equipment that favors the training of skills in electronics, programming and mechanics.

Another objective is to provide didactic robot type equipment that presents relatively simple construction and manufacture.

Another objective is to provide didactic robot type equipment that has low acquisition, operation and maintenance costs, to be accessible for numerous applications in the area of teaching.

DESCRIPTION OF THE INVENTION

In view, therefore, of the aforementioned problems and in order to overcome them and in order to meet the related objectives, the mobile didactic robot for education, object of the present invention, was developed, which is essentially comprised: by an electronic system for controlling the movement and work operations of the robot; movement system formed by a pair of sets of front, equal, symmetrical and opposite wheels, corresponding stepper motors; central rear transferring sphere; and by ultrasonic sensors, range sensors, distance sensor, sensor of the accelerometer, image sensor, webcam camera; work performance system comprising: front assembly of pallet fork lift; agricultural sprayer set and others; control system comprising remote control device; rectangular prismatic housing, with irregular octagonal horizontal section, modulated, with mountable/demountable modules comprising: lower structural chassis, intermediate chassis, upper cover; set of surrounding closing fairings: front, side and rear; by mounting devices comprising screws and nuts and/or magnetic buttons; light and sound signaling set; buttonhole and power supply system formed by battery and connector for 24-volt direct current electric power supply cable.

This construction overcomes the problems and limitations of the state of the art, mentioned above, since it provides: Modularity and Flexibility—Unlike prior art equipment, the present robot is designed with a modular structure that allows easy assembly and disassembly. This allows students to adapt the robot to their specific learning and experimentation needs, expanding the possibilities of customization and customization without losing its industrial and professional aspect.

Advanced Technologies Integration: This robot has integration with programming platforms widely used in the industry, in addition to having the possibility of integration with embedded development boards such as Raspberry and Arduino, in addition to having the possibilities of programming using Python and ROS (Robot Operating System). This characteristic provides students with the opportunity to develop skills in low and high-level programming, in addition to understanding fundamental concepts of control and automation, overcoming the limitations of the usual equipment.

Improved Mobility and Autonomy: The present robot features advanced mobility and autonomous navigation features, allowing the robot to move independently in controlled environments. Using sensors and intelligent navigation algorithms, students can explore concepts such as computer vision, environment mapping and real-time decision-making, providing a more complete and immersive experience. Such advantageous aspects meet the main object of the invention In addition to these advantageous aspects in relation to the equipment of the state of the art, the present robot presents relatively simple construction and manufacture and low acquisition, operation and maintenance costs, thus meeting other objects of the invention

DESCRIPTION OF DRAWINGS

The attached drawings refer to the mobile didactic robot for education, object of the present patent application, in which.

DETAILED DESCRIPTION OF THE INVENTION

Figure 1:
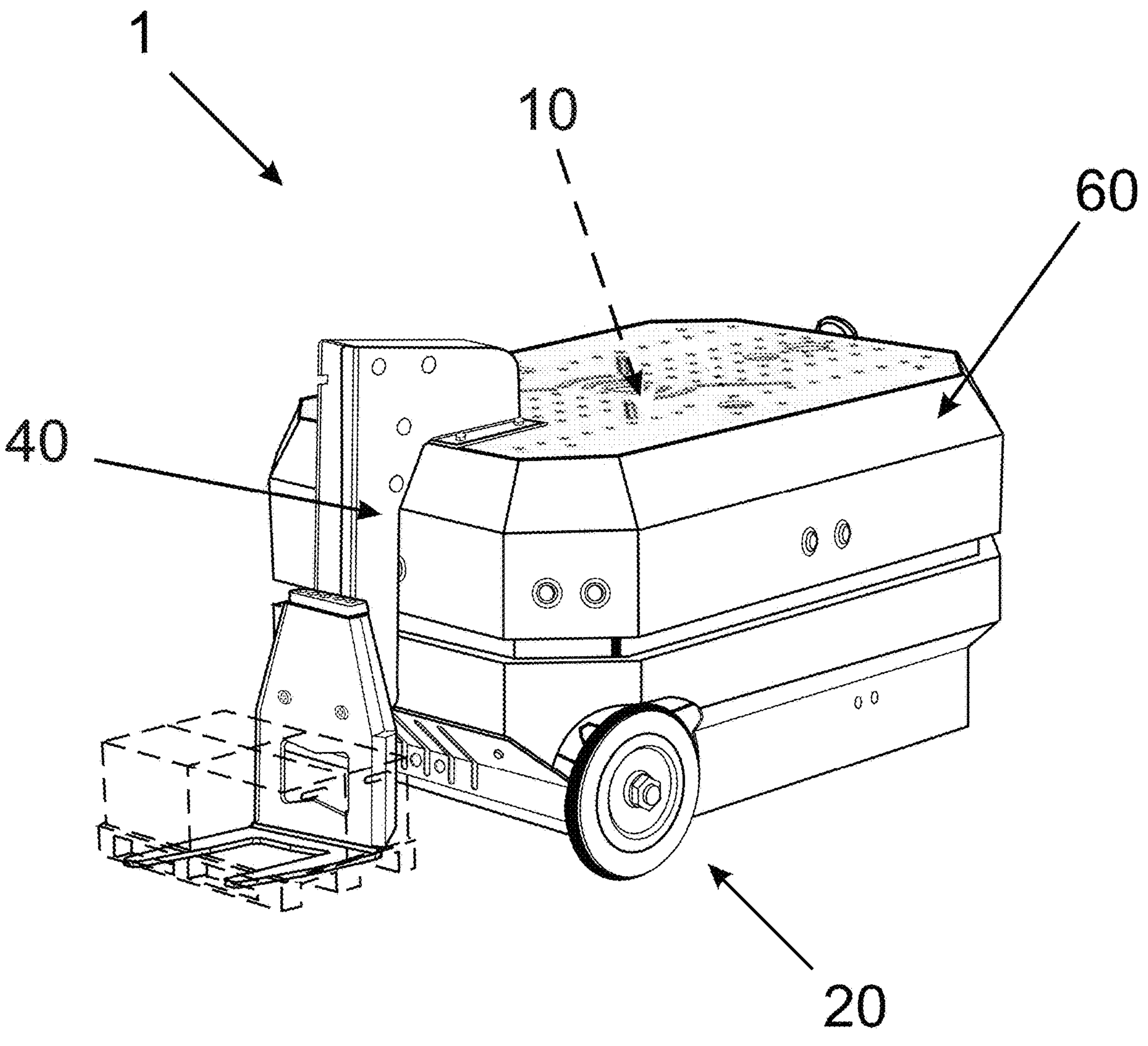
FIG. 1 shows the robot 1 in perspective and having assembled a work performing device 40 in the form of pallet fork.

As illustrated in the figures above and provided for in the description, the object of the present description, is an auxiliary equipment for the teaching and learning of technological disciplines, such as: electronics, programming and mechanics, intended for students of technical level, undergraduate, graduate and also for improvement courses, and is understood, essentially (FIG. 1): by electronic system 10 responsible for the command of the functionalities (movement, work) of the robot; by movement system 20; by work performance system 40; by housing 60 that houses and has mounted systems 10, 20, 40.

Figure 2:
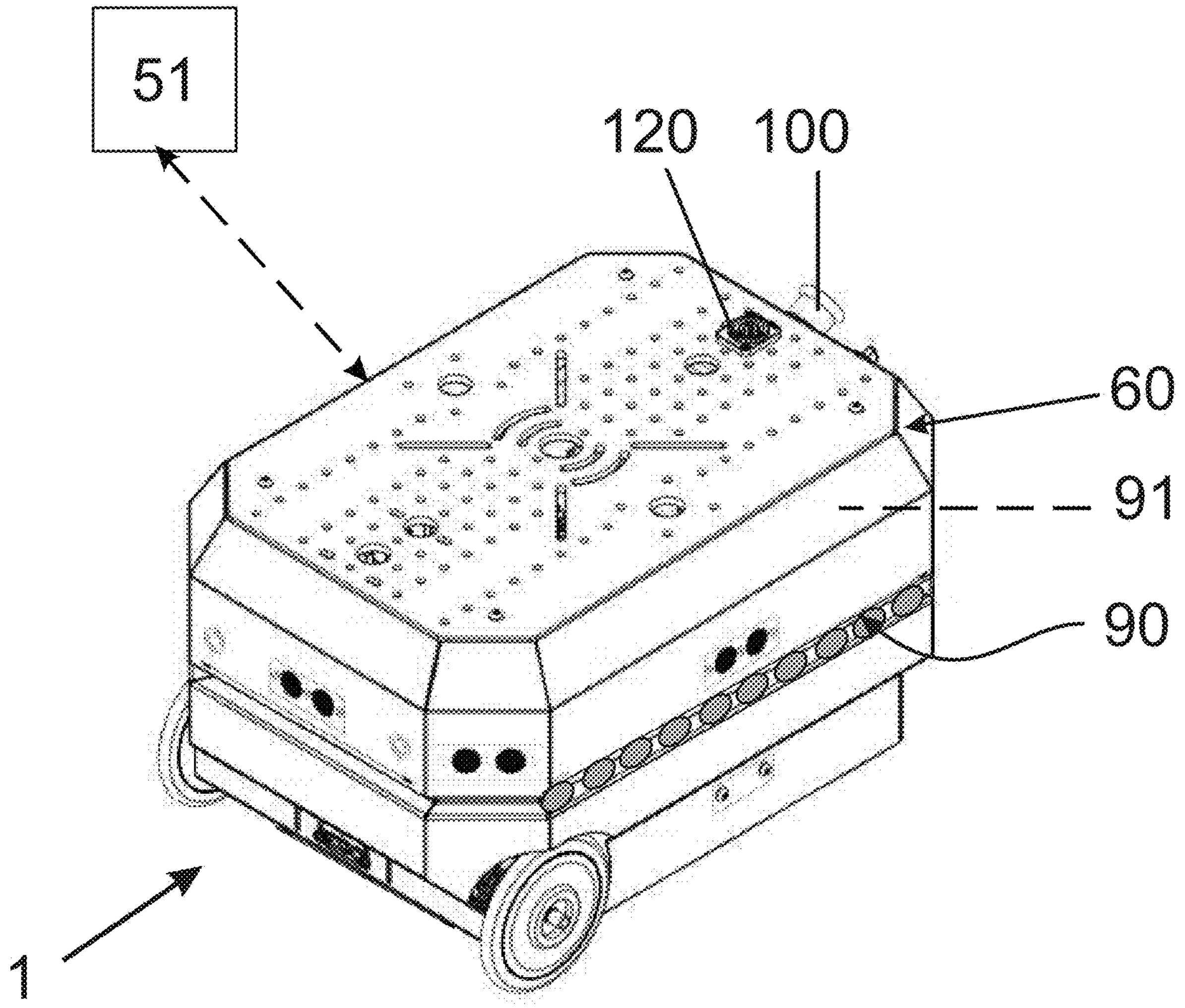
FIG. 2 shows the robot 1 in perspective and the indication of devices for remote control 51.
Figure 3:
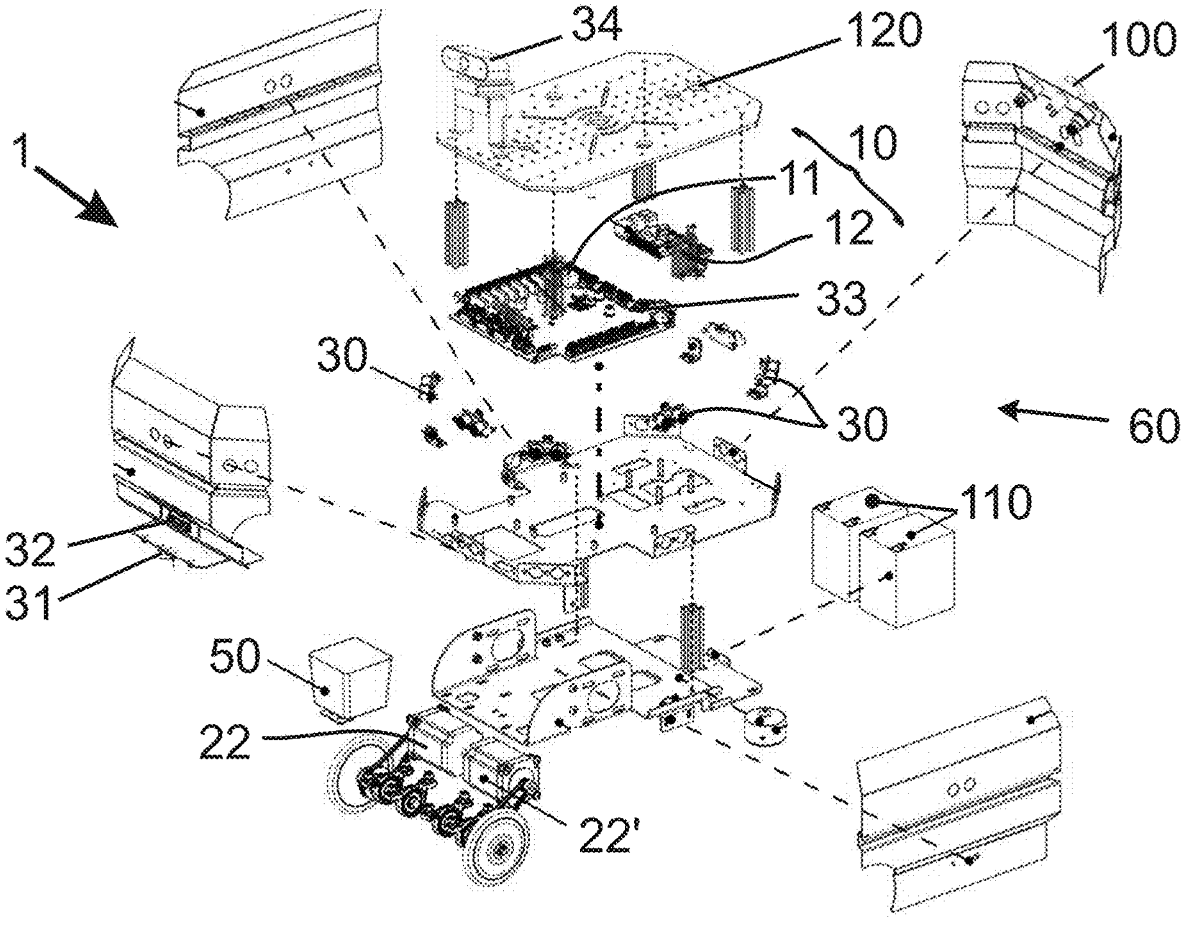
FIG. 3 shows the robot 1 in exploded view and the indication more precisely of electronic components of the robot 1.
Figure 4:
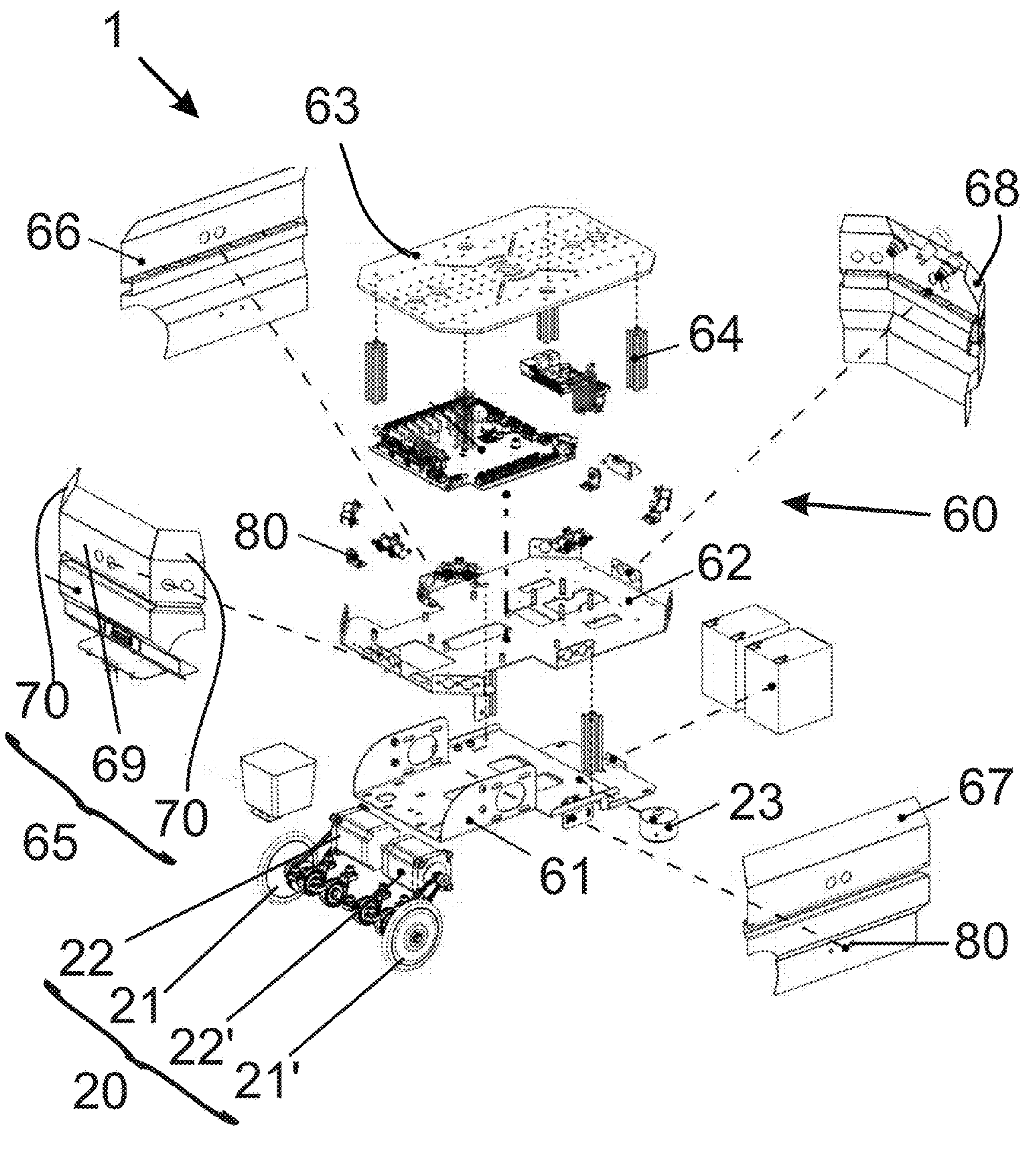
FIG. 4 shows the same previous figure, but more precisely indicating mechanical components of the robot 1.
Figure 5A:
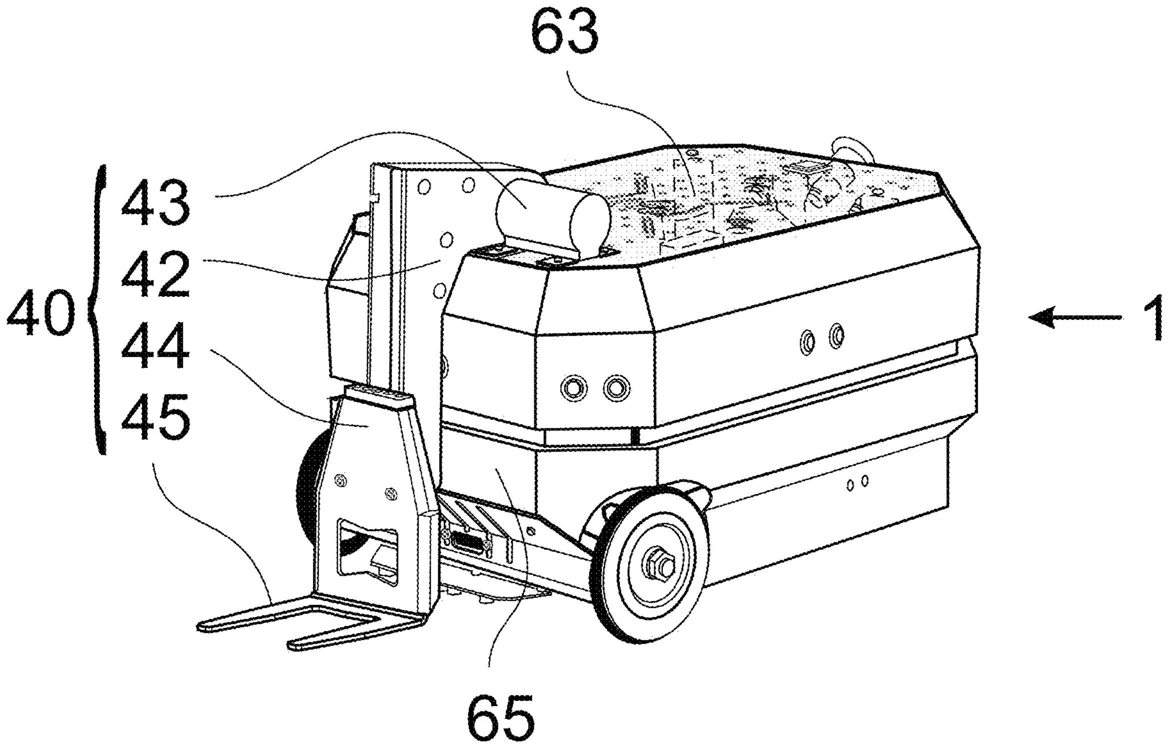
FIG. 5A shows the robot 1 in perspective having assembled a work performance device 40 of type with pallet fork 45.
Figure 5B:
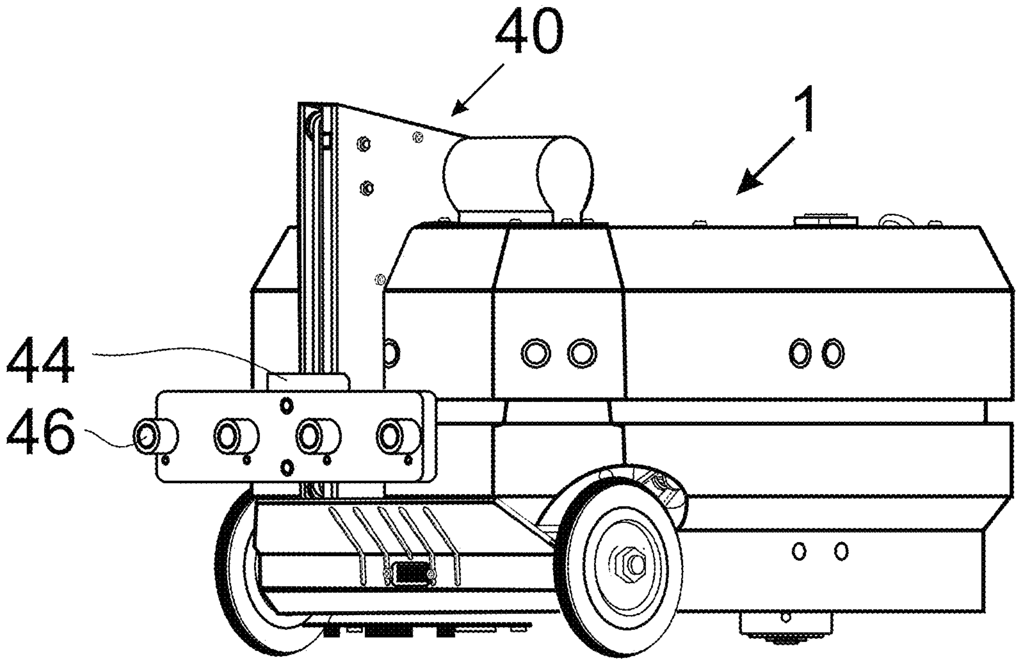
FIG. 5B shows the same as the previous figure, but having the device that performs work 40 of type with base and electromagnets 46.
Figure 6:
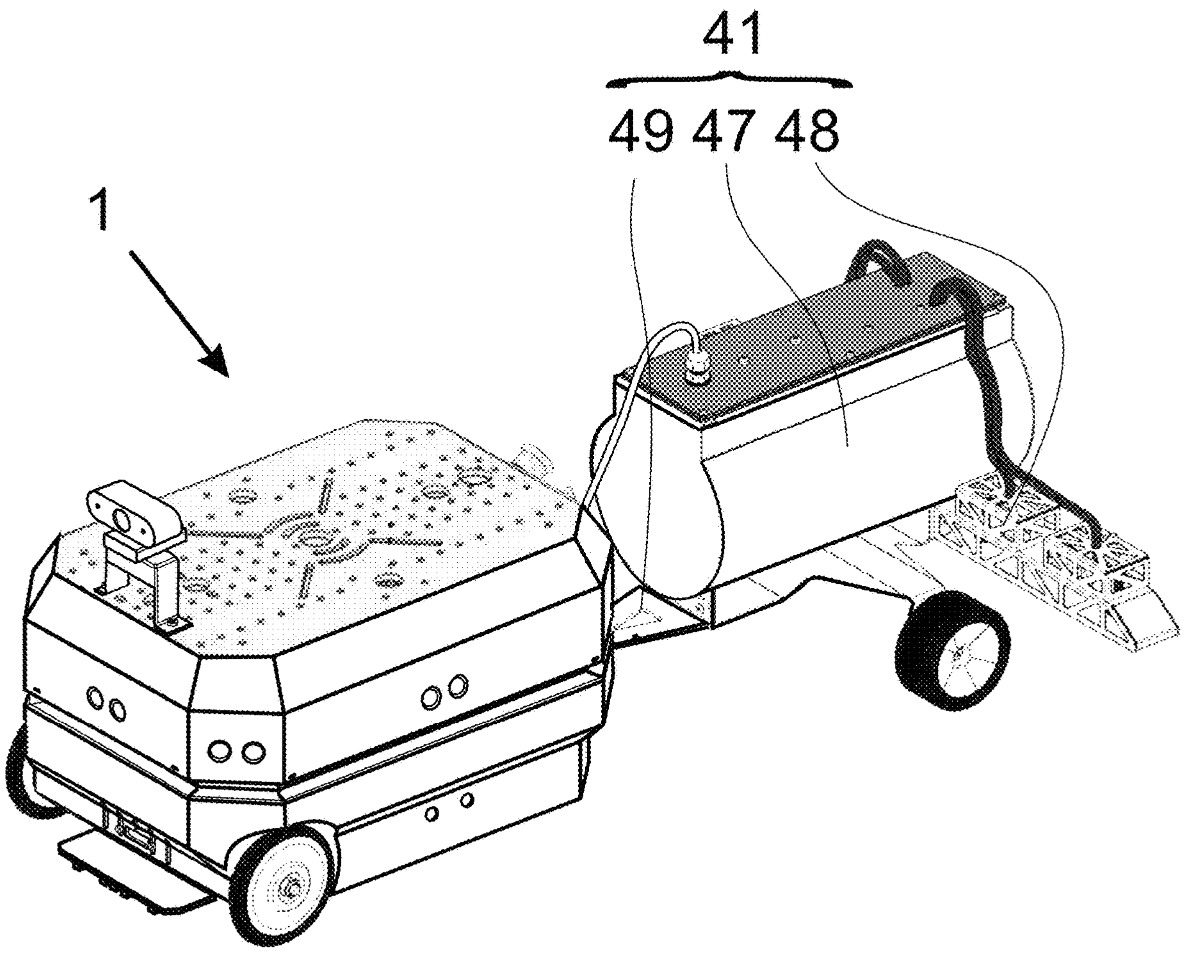
FIG. 6 shows the robot 1 having assembled working device in the form of sprayer 41.

In the present invention the main object to be protected in the patent, the robot comprises a:

- Electro-electronic system 10 of command of the functionalities (movement, work) of the formed robot, essentially (FIG. 3): by two embedded associated plates: Power Control Board 11; and Single Board Computer (CPU) 12, both consisting of electronic prototyping boards and the CPI 12 comprised, preferably by a Raspberry PI 4 Plus board; said boards programmed and assembled by the student(s) according to the intended functions for the robot;
- Movement system 20 comprised (FIG. 4): by pair of sets of front, equal, symmetrical and opposite wheels, right 21, left 21'; corresponding stepper motors 22, 22'; and central rear transferring ball 23 mounted on the lower structural chassis 61 of the housing 60; said movement system 20 also comprising a set of auxiliary navigation sensors 30-34 (FIG. 3) comprised of: eight ultrasonic sensors 30 mounted around housing 60; line sensor 31 and infrared distance sensor 32, mounted low in front of housing 60, accelerometer sensor 33; camera (webcam) image sensor 34 mounted up in front of housing 60;
- System of work performance devices according to the purpose of the robot 1 comprised: by front assembly of elevator pallet fork 40 (FIGS. 5 A, 5 B); agricultural sprayer assembly 41 (FIG. 6) and others assembled in association with the housing 60;
- Movement command system (navigation) and command of the work operations of the robot 1 comprised (FIG. 2): by remote control device 51 external to the robot 1; said sensors 30 to 34 and the remote control devices 51 constitute a movement command (navigation) and command system of the work operations of the robot 1 in real time, such that the sensors 30 to 34 automatically generate sensing signals of the place of movement of the robot 1 and/or the remote control devices 51, operated by student(s) with navigator function, generate remote control signals; said sensing signals and/or remote command signals are transmitted to the CPU 12 which processes them and generates command signals for the set of wheels 21, 21 and stepper motor 22, 22 and/or for the work performance devices 40, 41; said System of movement command (navigation) and command of the work operations of the robot 1 may also be of a pre-programmed type for use in a controlled environment, when then a suitable algorithm residing in the CPU 12 is provided that performs navigation maneuvers and/or work operations automatically at appropriate times of the movement of robot 1;
- Rectangular prismatic housing 60, with irregular octagonal horizontal section, modulated, with mountable/demountable modules comprising (FIG. 4): lower structural chassis 61, intermediate chassis 62, upper cover 63, set of aluminum profile columns 64 interspersed with chassis 61, 62 and cover 63 and that assemble and support these to each other, forming the bearing structure (skeleton) of the robot; set of surrounding closing fairings comprising: front fairing 65; side fairings, right 66, left 67, rear fairing 68, this and the front fairing 65 faceted, configured by a larger intermediate face 69 and two smaller, extreme, equal, symmetrical, opposite faces 70 arranged at 450 in reaction to the intermediate; said fairings 65, 66, 67, 68 and the cover 63 are mounted to the bearing structure of the robot and/or to each other by mounting devices 80 comprised of screws and nuts and/or magnetic buttons;

Said robot further comprised of (FIG. 2): lighting signaling set formed by LED strip 90 surrounding the housing 60; by Buzzer 91 sound signaling; by speaker 50; by emergency pushbutton 100 (FIG. 3) selector switch, emergency button and on/off button located at the rear of the robot; electrical supply system formed by battery 110 and connector 120 for 24-volt direct current electrical power supply cable, all associated/belonging to the robot's electro-electronic system 10.

The following descriptions are intended to further detail the robot components:

Thus, the Power Control Board 11 manages all the peripherals of the robot, is associated with the CPU 12 through USB communication and receives commands according to its API, for the control of the robot (hardware).

Figure 7:
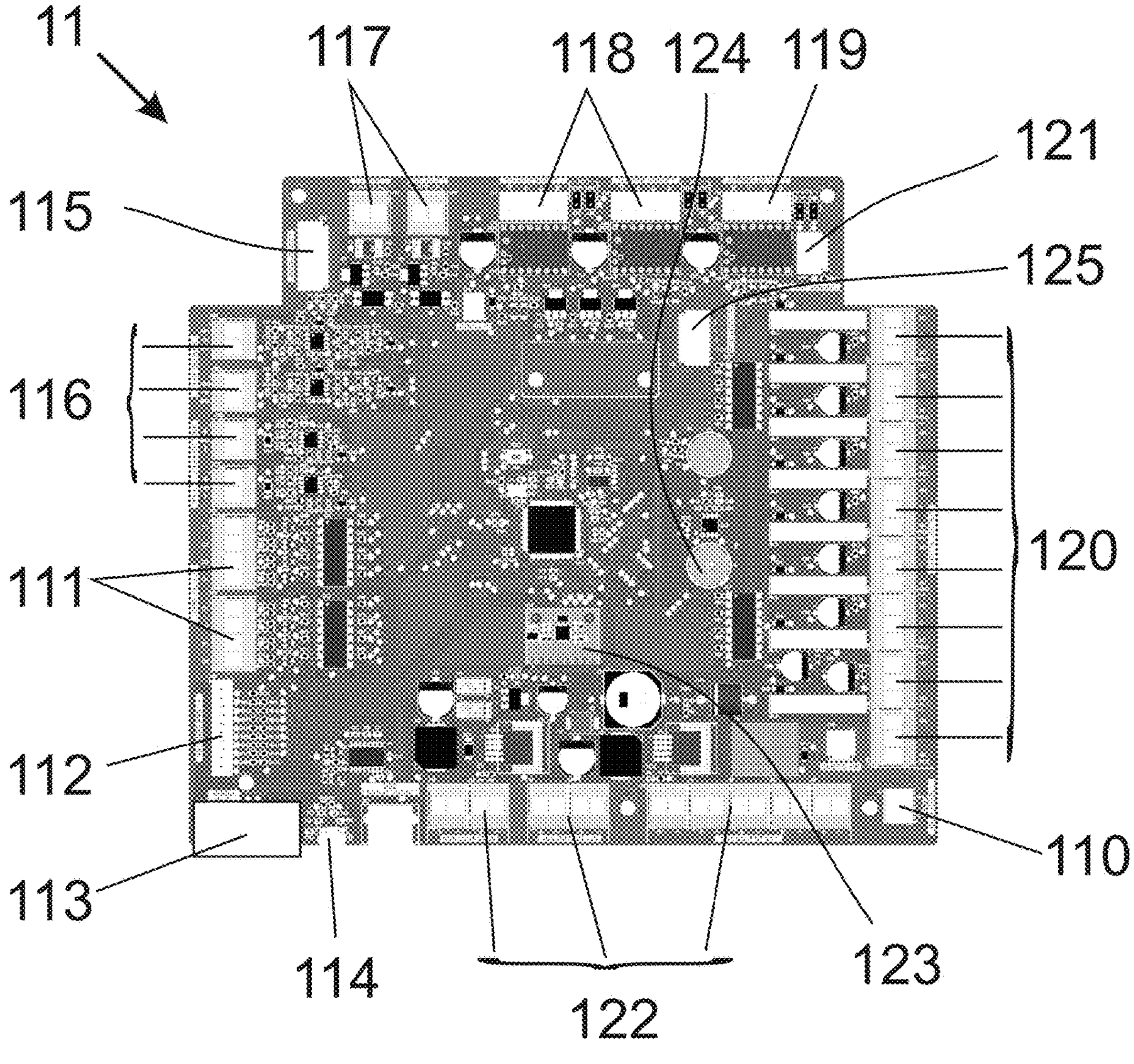
FIG. 7 shows the Power Control Board 11.

Said Power Control Board 11 incorporates suitable power circuit and provides essentially (FIG. 7): 24 VDC power input 110; digital inputs 111; connector for ultrasonic distance sensors 112; connector for UART serial communication 113; connector for USB communication 114; connector for PCB lane sensors 115; analog inputs 116 0 . . . 5V; 0 . . . 10V; 4 . . . 20 mA; analog outputs PWM 117; outputs 118 for stepper motor 22 (left wheel), stepper motor 22 (right wheel); output 119 for stepper motor 3; digital outputs 120 (relays); connector 121 for infrared distance sensor; auxiliary outputs 122 for 5 VDC, 12 VDC, 24 VDC supply; accelerometer sensor 123; buzzer beacon with oscillator 124; output for RGB LED strip 125.

Figure 8:
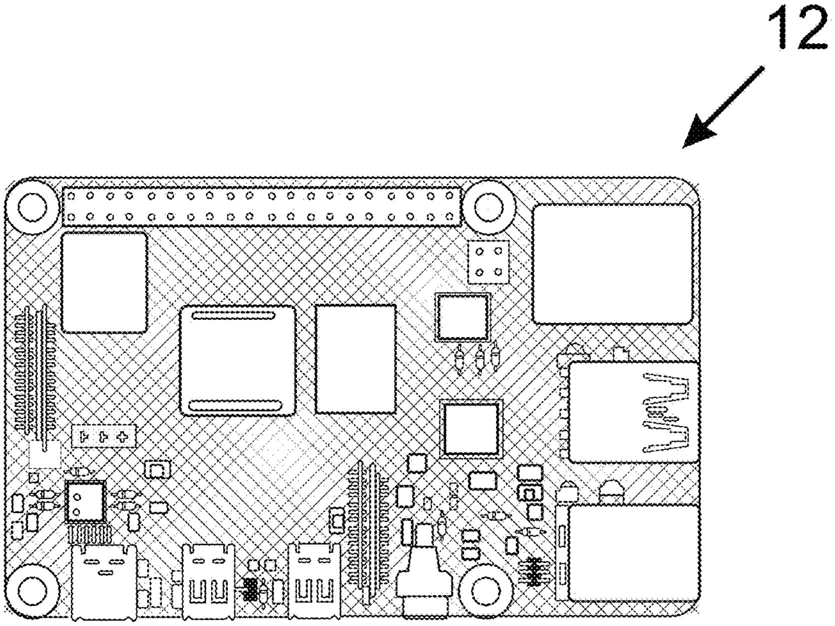
FIG. 8 shows the indication of CPU 12.

The CPU 12 (FIG. 8) is variable, and in the example of construction of the robot, described herein, said CPU is comprised of Raspberry Pi Board, but several other electro-electronic prototyping plates can be used in this same condition, such as: Arduino, Beagle Bone, ESP32, programming devices using Python and ROS (Robot Operating System) and other electronic prototyping devices/single board mini-computer, which can be used in a USB communication between the boards 12 and 11, for access to the control of the robot hardware, these boards being programmed by the student(s) according to the intended function(s) for the robot.

Figure 9:
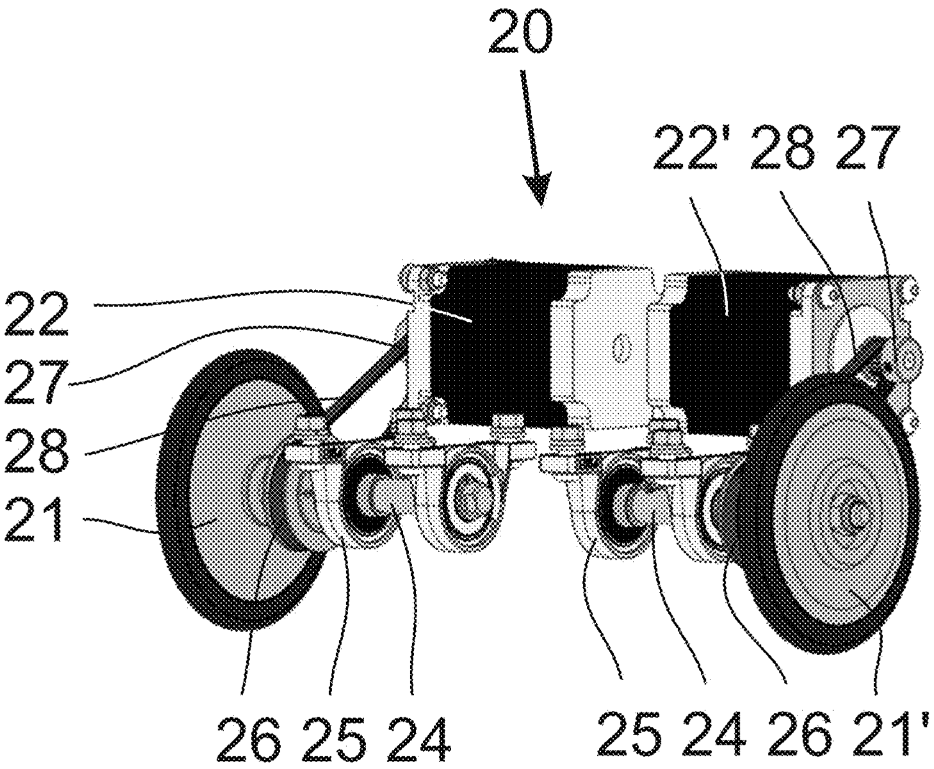
FIG. 9 shows the right and left wheel assembly 21-22.

The sets of wheels, right 21, left 21 and corresponding stepper motors 22, 22 are equal, symmetrical and opposite, each set being formed (FIG. 9): by shaft 24, one end of which is free and faces and aligned with the free end of the shaft of the other wheel assembly and the opposite end of said shaft 24 has mounted the wheel 21/21; by bearings 25 on which the shaft 24 is mounted and which are mounted on the lower structural chassis 61; by pulley 26 mounted on the end of the shaft 24 adjacent to the wheel 21/21' and power take-off 27 constituted by the end of the motor shaft 22/22'; by drive belt 28 mounted on the pulleys and power take-off. The transferring ball 23 has usual construction, comprising, essentially: by housing mounted on the structural chassis 61, by larger central ball mounted on the housing and with lower sector projected out of it, by smaller bearing balls mounted between the main ball and the wall of the housing and by seals.

The ultrasonic sensors 30 are of a sonar-like type, equipped with a transmitter of an irradiation and a receiver of the reflected irradiation from a surface adjacent to the trajectory of the robot and from which it must deviate, said reflected irradiation being received and fed into the electro-electronic system 10, Power Control Board 11 and CPU 12, where a command signal is processed and generated for 1) —maintenance of equal speeds for the stepper motors 22, 22' and consequent rectilinear trajectory or 2) —speed variation of one of the stepper motors 22 or 22', according to the position of the surface that generated the reflected irradiation wave and from which the robot must deviate, a speed variation that provides the generation of a curved trajectory for the robot.

The elevator pallet fork assembly 40 is formed (FIG. 5 A): by inverted "L" support 42 whose horizontal branch constitutes a base that is mounted on the cover 63 and the vertical branch incorporates a lift that is hung in front of the front fairing 65 and formed: by motor and spool assembly 43 incorporated on the side of the horizontal branch of the "L" support 52, by base-support 44 movable in guide of the vertical branch of the "L" support 42, by cable (not illustrated) with ends mounted on the spool and base-support 44; said lift pallet fork assembly 40 further formed by fork 45 that is mounted on the base-support 44, the assembly/disassembly of the "L" support 42 being made on surfaces/holes of the cover 63 and the assembly/disassembly of the parts of the lift pallet fork assembly 40 being made between surfaces of said parts; said assemblies/disassembly's being made through the mounting means 80, comprised of screws and magnetic nuts or buttons. Said elevator pallet fork assembly 40 may be comprised of base assembly and electromagnets 46 mounted on base-holder 44 (FIG. 5B) replacing fork 45.

The agricultural sprayer assembly 41 is formed, essentially (FIG. 6): by tank and wheel assembly 47 containing reservoirs and means of pressurizing the liquid to be sprayed; by trusses supporting the spray nozzles 48, mounted transversely under the rear of the tank; by front hitch 49 that engages in corresponding rear hitch of the robot 1; said assemblies/disassembly's made on surfaces/holes of the parts of the agricultural spray assembly 41 through the mounting means 80, screws and nuts or magnetic buttons.

The remote-control devices 51 may be comprised of: computer or notebook or tablet or smartphone or joystick programmed and operated by student(s).

The housing 60 has the lower structural chassis 61 provided with a front end that supports the stepper motors 22, 22' and a rear end that supports the batteries. The intermediate chassis 62 has perforated peripheral flaps that support the ultrasonic sensors 30. The fairings 65, 66, 67, 68 have openings for exposure of the ultrasonic sensors 30, the front fairing 65 supports the track sensors 31 and infrared 32, the upper edges of said fairings are adjacent to the edges of the cover 63; the vertical edges of said fairings are adjacent to each other, and the lower edges are free and lie around the lower structural chassis 61. Upper cover 63 and intermediate chassis 62 have irregular octagonal contours. The top cover 63 has the surface provided with a plurality of sections of surfaces interspersed by holes/openings for mounting the accessories working in association with the robot 1.

When robot 1 is in use, the student(s) receives instructions about an intended application for it and proceeds to develop the construction and function characteristics for robot 1 necessary for the application.

Within this, programming (algorithm) suitable for the application is developed using one of the various languages as alluded to above. The constituent plates of the Power Control Board 11 and CPU 12 are assembled. The housing 60 has parts disassembled as needed and the plates 11 and 12 and peripherals to be used are mounted on the intermediate chassis 62 and other surfaces of the housing 60. The device for carrying out work assembly of elevator pallet fork 40 and/or agricultural sprayer 41 has its parts assembled and is assembled in suitable part of the robot 1. Electro-electronic connections of the peripherals to each other and to the plates 11 and 12 are made. The parts of the carcasses 60, which had been disassembled, are reassembled and the final adjustments are made, all this providing the student(s) with training in the areas of programming, electronics and mechanics, according to the objective of robot 1.

Once assembled and connected, the robot 1, via its running assembly composed of wheels 21, 21', stepper motors 22, 2' and transferring sphere 23, moves; the sensors 30 to 34 sense the area in which the robot 1 moves and the intended movement conditions for this and navigation is done by a student navigator through the remote navigation device 51 for real-time navigation or through pre-programmed navigation through a navigation algorithm resident in the CPU 12 and its devices that perform work, such as, elevator pallet fork assembly 40 and/or agricultural sprayer assembly 41 or others, perform their work at appropriate times of the movement of the robot 1 driven by a student through the remote command device 51 and/or through an algorithm for performing work operations resident in the CPU 12.

Within the basic construction, described above, the robot 1, object of the present patent application, may present modifications related to materials, dimensions, constructive details and/or functional and/or ornamental configuration, variations of computer technology solutions and others without departing from the scope of the requested protection.

Within this, robot 1 falls within the category of Multitasking Collaborative Land Mobile Robot, for industrial, agro-industrial, hospital, logistics and professional training applications, for practical and theoretical activities and tasks such as the consolidation of knowledge through research and training. It has housing 60 (base) in aluminum alloy ABNT-6063, wheels 21, 21' of aluminum alloy ABNT-6063 and polyurethane (expanded PU).

Robot 1 has a metallic structure in fairing 61 to 68 in painted steel, which is painted with grey polyester base powder RAL 7024, microtextured finish, with a semi-transparent fume acrylic top cover of 5 millimeters thick.

The robot 1 can be equipped with standard NEMA-23 22, 22' stepper motors or 12 or 24 Volt direct current motors, can incorporate features to be used in conjunction with special development boards, microcomputers, notebooks or laptops, computers, smartphones and/or tablets, through software, applications, firmware, including web platforms, using the concept of IoT (Internet of Things) and Cloud (Internet Computing), using Virtual Reality, Artificial Intelligence, Machine Learning, with local application programming interface or via internet.

Robot 1 contains electrical power converter, memory devices for recording, reproducing or transmitting sound and image, portable media player speaker, rechargeable batteries, power sources, digital cameras, receivers and transmitters of radio frequency signals, integrated into the data acquisition board and signal generator, motor controller and inductive and/or resistive loads that can be driven by it, in addition to having several electronic components for embedded systems.

Robot 1 has a programming interface compatible with Phyton, Java, C, C++, C#, Javascript, PHP, Ruby and Rails, GO, Scrath, among several other development languages.

Robot 1 has the following dimensions, Height: 246.5 mm Width: 294 mm Length: 425 mm Weight: 12.45 Kg External signaling via RGB led, configurable pushbuttons, sonar sensors and infrared sensors for distance measurement.

Robot 1 features data buses and communication protocols via serial communication API; wireless receivers and transmitters; digital signal converters; analog signal converters; programmable input and output memories and peripherals; firmware; Unix architecture-based operating system; random access memory; read-only access memory; intercommunication with various programming platforms

The invention claimed is:

1. A mobile didactic robot for education, comprising: an electro-electronic system responsible for command of functionalities of the robot, a housing configured to support and accommodate components of the electro-electronic system, a movement system and a work performance system, the housing being a rectangular prismatic housing having an irregular octagonal horizontal cross-section and comprising a plurality of mountable and demountable modules, the housing comprising;

a lower structural chassis (61);

an intermediate chassis (62);

an upper cover (63);

a set of aluminum profile columns (64) interspersed with the lower structural chassis (61), the intermediate chassis (62), and the upper cover (63), wherein the lower structural chassis (61), the intermediate chassis (62), the upper cover (63), and the set of aluminum profile columns (64) are assembled to, and support, one another to form a bearing structure of the housing (60);

a set of surrounding closing fairings comprising a front fairing (65), a right-side fairing (66), a left side fairing (67), and a rear fairing (68), wherein each of the front fairing (65) and the rear fairing (68) is faceted and comprises a larger intermediate face (69) and two smaller extreme faces (70) that are equal, symmetrical, and opposite to one another and are arranged at 45 degrees relative to the larger intermediate face (69), and a plurality of mounting devices (80) comprising at least one of a screw-and-nut fastener, and a magnetic button, wherein the set of surrounding closing fairings and the upper cover (63) are mounted, by the plurality of mounting devices (80), to at least one of one another and the bearing structure of the housing (60);

electro-electronic system (10), disposed in the housing (60), for controlling functionalities of the robot the electro-electronic system (10) comprising:

a power control board (11) and a single board computer (12), communicatively coupled to the power control board (11). wherein the single board computer (12) is configured to be programmed by one or more students according to intended functions of the robot;

the movement system (20) comprising:

a right front wheel assembly (21) and a left front assembly (21') the right front wheel assembly (21) and the left front wheel assembly (21') being equal symmetrical, and opposite to one another, a stepper motor (22) corresponding to the right front wheel assembly (21), and a stepper motor (22') corresponding to the left front wheel assembly (21');

a central rear transferring sphere (23) mounted on the lower structural chassis (61) of the housing;

a set of auxiliary navigation sensors comprising:

a plurality of ultrasonic sensors (30) mounted around the housing (60);

a line sensor (31) and an infrared distance sensor (32), mounted lower in front of the housing (60), an accelerometer sensor (33); and a camera image sensor (34) mounted up in front of the housing (60);

the work performance system (40) comprising a set of devices for carrying out work according to an intended application of the robot, the set of devices comprising:

a front assembly of a lift pallet fork (40);

an agricultural sprayer assembly (41) mounted in association with the housing (60);

a movement command system and a work operation command system wherein the robot is configured to be controlled, in real time, by a remote-control device (51) external to the robot;

a lighting signaling set comprising: a red, green, and blue light emitting diode (RGB LED) strip (90) surrounding the housing (60); a buzzer (91) configured to generate audible signaling; a rear control assembly (100), disposed at a rear of the housing (60), comprising a selector switch, an emergency button, and an on/off button; and an electrical supply system comprising a battery (110) and a connector (120) for a 24-volt direct current electrical power supply cable, wherein the RGB LED strip (90), the buzzer (91), the rear control assembly (100), and the electrical supply system are each operatively associated with the electro-electronic system (10).

2. The mobile didactic robot for education, according to claim 1, wherein the power control board (11) is associated with the single board computer (12) through universal serial bus (USB) communication, receives commands according to an application programming interface (API) of the single board computer (12) and comprises a power circuit configured to manage peripherals of the robot and the power circuit providing, a 24 volt direct current (VDC) power input;

a digital inputs connector for the ultrasonic distance sensors (12);

connector for universal asynchronous receiver-transmitter (UART) serial communication;

a connector for USB communication;

a connector for peripheral component interconnect (PCI) lane sensors;

a plurality of analogue inputs configured to receive an analogue signal in a range of at least one of 0 to 5 volts, 0 to 10 volts, and 4 to 20 milliamps;

a plurality of pulse width modulation (PWM) analogue outputs;

an output for er motor (22') corresponding to the right front wheel assembly (21);

an output for the stepper motor (22') corresponding to the left front wheel assembly (21');

an output for a stepper motor of the work performance system (40);

a plurality of digital outputs comprising relays;

a connector for infrared distance sensor (32);

a plurality of auxiliary outputs comprising 5 VDC, 12 VDC, 24 VDC power supplies;

the accelerometer sensor (33);

a buzzer beacon with oscillator; and an output for RGB LEDs strip.

3. The mobile didactic robot for education, according to claim 1, wherein the single board computer (12) is selectable from a plurality of electronic prototyping boards and is configured to be programmed, using a programming language and a robotics middleware framework, by the one or more students according to the intended functions of the robot.

4. The mobile didactic robot for education; according to claim 1, wherein the right front wheel assembly (21), the left front wheel assembly (21'), and the corresponding stepper motors (22, 22') are equal, symmetrical, and opposite to one another. each of the right front wheel assembly (21) and the left front wheel assembly (21') comprising:

shaft (24), a first end of which is free and faces and is aligned with a free end of the shaft (24) of the other of the right front wheel assembly (21) and the left front wheel assembly (21'), and a second end of which has a wheel (21/21') mounted thereon;

bearings (25) on which the shaft (24) is mounted and the bearings (25) being mounted on the lower structural chassis (61);

pulley mounted on the second end of the shaft (24) adjacent to the wheel (21/21') and a power take-off (27) constituted by an end of a shaft of the corresponding stepper motor (22, 22'); and;

drive belt (28) mounted on the pulley (26) and the power take-off (27).

5. The mobile didactic robot for education, according to claim 1, wherein the ultrasonic sensors are of a sonar-like type, each comprising a transmitter configured to transmit an irradiation and a receiver configured to receive a reflection of the irradiation from a surface, wherein the reflected irradiation is received and fed into the electro-electronic system (10), the power control board (11), and the single board computer (12), which process the reflected irradiation and generate a command signal to (1) maintain equal speeds for the stepper motors (22, 22') to produce a rectilinear trajectory for the robot, or (2) vary a speed of one of the stepper motors (22, 22') to produce a curved trajectory for the robot.

6. The mobile didactic robot for education according to claim 1, wherein the lift pallet fork assembly (40) comprises:

an inverted L shaped support (42) having a horizontal branch and a vertical branch, the horizontal branch constituting a base that is mounted on the upper cover (63) and the vertical branch supporting a lift and disposed in front of the front fairing (65) and wherein the lift pallet fork assembly (40) alternatively comprises a base and an electromagnet assembly (46) mounted on the base-support (44) in place of the fork.

7. The mobile didactic robot for education; according to claim 1, wherein the agricultural sprayer assembly (41) comprises:

a tank and wheel assembly (47);

trusses supporting the sprayer nozzles (48); and a front hitch (49) configured to engage a corresponding rear hitch of the robot.

8. The mobile didactic robot for education; according to claim 1 wherein the remote-control device (51) is selected from the group consisting of a computer or a notebook or a tablet or a smartphone and a joystick, programmed for the application and operated by one of more students.

* * * * *